United States Patent
Peterson

(10) Patent No.: US 7,325,576 B2
(45) Date of Patent: Feb. 5, 2008

(54) INFLATABLE SUCTION HOSE

(76) Inventor: Burt J. Peterson, 33834 Loland Dr., Waterford, WI (US) 53185

(*) Notice: Subject to any disclaimer, the term of this patent is extended or adjusted under 35 U.S.C. 154(b) by 0 days.

(21) Appl. No.: 11/501,444

(22) Filed: Aug. 9, 2006

(65) Prior Publication Data
US 2007/0044859 A1 Mar. 1, 2007

Related U.S. Application Data

(60) Provisional application No. 60/706,528, filed on Aug. 9, 2005.

(51) Int. Cl.
*F16L 11/00* (2006.01)
(52) U.S. Cl. .................. 138/115; 138/106; 138/109
(58) Field of Classification Search ............... 138/93, 138/106, 115, 116, 119, 177, 121, 122, 104, 138/109
See application file for complete search history.

(56) References Cited

U.S. PATENT DOCUMENTS

| | | | | |
|---|---|---|---|---|
| 2,396,059 A | * | 3/1946 | Roberts | 138/122 |
| 2,896,612 A | * | 7/1959 | Bates et al. | 601/149 |
| 2,943,859 A | * | 7/1960 | Koski et al. | 473/214 |
| 3,300,910 A | * | 1/1967 | Isaac | 52/2.19 |
| 3,364,632 A | * | 1/1968 | Isaac | 52/2.22 |
| 3,991,822 A | * | 11/1976 | Morris | 165/140 |
| 4,065,888 A | * | 1/1978 | Napierski | 52/2.21 |
| 5,865,215 A | * | 2/1999 | Freed | 138/109 |
| 6,024,132 A | * | 2/2000 | Fujimoto | 138/122 |
| 6,948,527 B2 | * | 9/2005 | Ragner et al. | 138/119 |
| 7,025,580 B2 | * | 4/2006 | Heagy et al. | 425/11 |
| 2002/0033554 A1 | * | 3/2002 | Heagy et al. | 264/269 |
| 2004/0003855 A1 | * | 1/2004 | Dees et al. | 138/93 |

* cited by examiner

*Primary Examiner*—James Hook
(74) *Attorney, Agent, or Firm*—Boyle Fredrickson S.C.

(57) ABSTRACT

A flexible suction hose has supporting ribs that may be inflated to hold the hose open against suction for use and deflated to allow the suction hose to be folded or collapsed for storage and transportation.

12 Claims, 3 Drawing Sheets

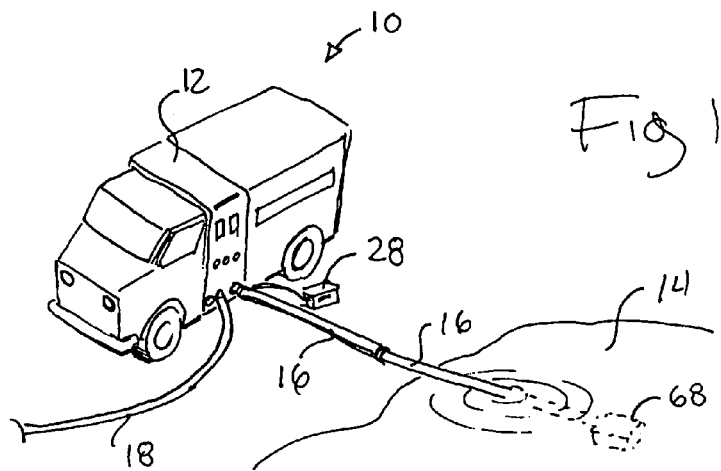
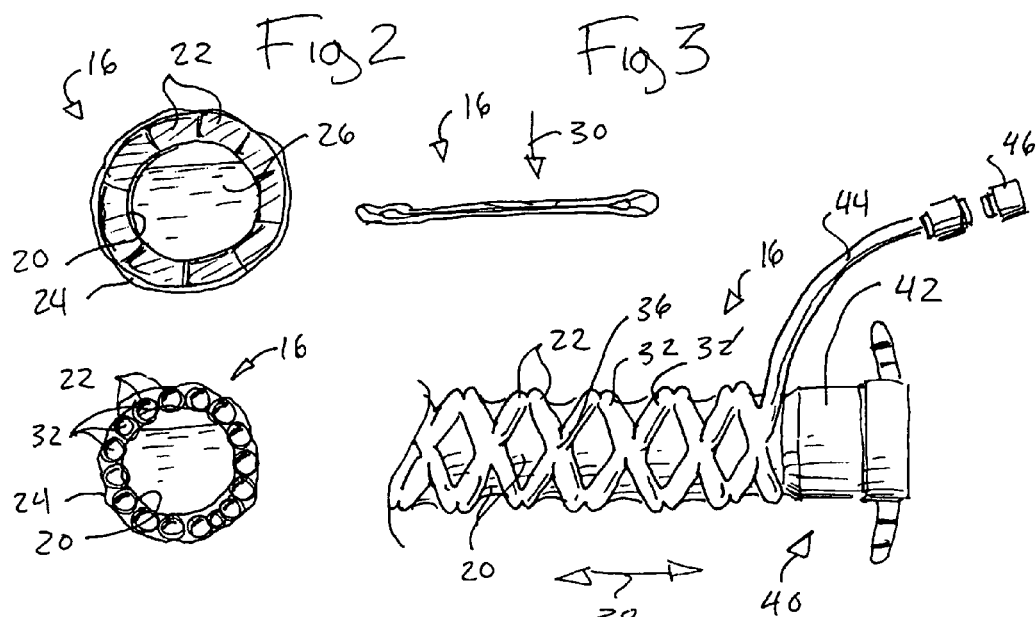

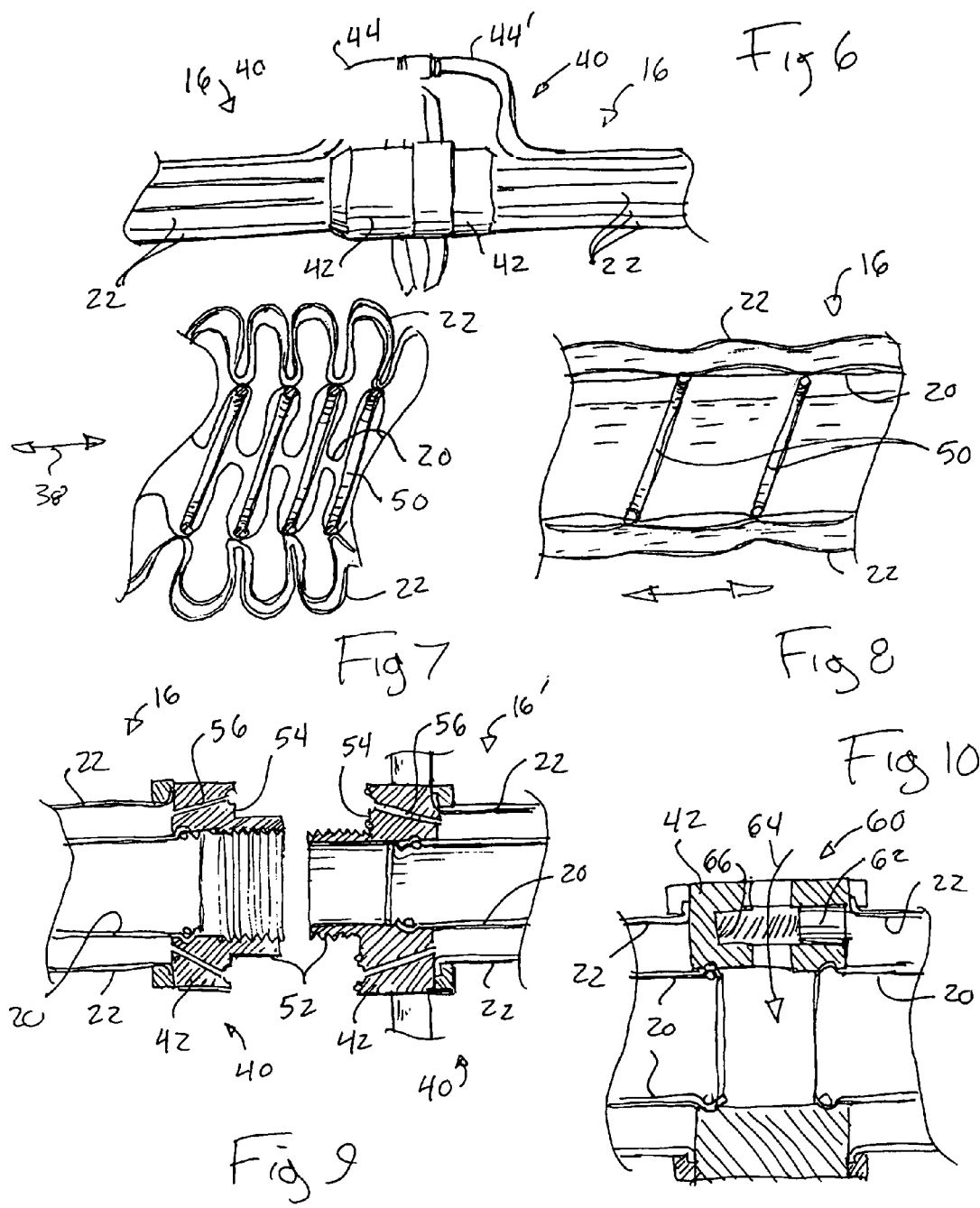

INFLATABLE SUCTION HOSE

RELATED CASES

This application claims the benefit of U.S. Provisional Application 60/706,528 filed Aug. 9, 2005, hereby incorporated by reference.

BACKGROUND OF THE INVENTION

In the process of fighting fires in rural areas, it is often necessary to obtain water from a non-pressurized source, such as a stream, river, or pond. For this purpose, a fire truck normally carries several lengths of non-collapsible suction hose, used to draw water from the source to the pump.

Because this hose is non-collapsible, it is difficult to store a significant length of this hose on the fire truck. Typically, the amount of hose stored is no more than twenty to thirty feet. This limitation is a particular problem when the truck cannot closely approach the source of the water, for example, when the area has received rain recently and there is no stable ground within twenty to thirty feet of the water source. Alternatively, when the weather is below freezing, it may not be possible to position the engine close enough to the water source, yet off of the ice, to reach water that is deep enough to pump. In these cases, a more distant water source must be used.

SUMMARY OF THE INVENTION

The present invention provides for a collapsible suction hose that may be carried in a folded state and then inflated for use on site. Inflated ribs, which may be filled with water or air on site, prevent the hose from collapsing under the negative pressure necessary to draw water into the hose by a pump or the like.

Specifically, the present invention provides the suction hose, having a conduit member providing a tubular body extending between a first and second opened end. The conduit member flexibly opens to provide a channel for passage of liquid between the first and second end and then collapses for storage. At least one inflatable stiffening rib is attached to the body to hold the conduit open when the rib is inflated and to allow the conduit to collapse when the rib is not inflated.

Thus, it is one object of at least one embodiment of the invention to provide a suction hose that may be collapsed for storage and thus which may be provided on site in greater length.

The suction hose may collapse by flattening the tubular body in a direction perpendicular to its length.

Thus, it is an object of at least one embodiment of the invention to provide a hose that may be rolled into compact spools.

Multiple inflatable ribs may extend parallel to an axis of the tubular body between the first and second end. The ribs may be tubes or may be adjacent sectors of a cylindrical annulus.

Thus, it is an object of at least one embodiment of the invention to provide a simple fabrication technique that provides a rigid inflatable shell to support the conduit under the negative pressure of suction.

The multiple inflatable ribs may provide passageways among the ribs for pressure equalization.

Thus, it is an object of at least one embodiment of the invention to simplify connection of the ribs to a pressurized source for inflation.

The inflatable rib may extend helically about an axis centered in the tubular body between the first and second ends.

Thus, it is an object of at least one embodiment of the invention to provide an embodiment having a simple rib structure.

At least two ribs may be used where one helix is a right-hand helix and the other helix is a left-hand helix.

Thus, it is an object of at least one embodiment of the invention to provide a rib structure that both extends and opens the tubular conduit.

The hose may include first and second couplings attached to the first and second ends, allowing interconnection of the suction hose with other similar suction hoses to provide a continuous channel between the suction hoses.

Thus, it is an object of at least one embodiment of the invention to allow arbitrary lengths of suction hose to be created by combining multiple suction hoses.

The couplings may provide a continuous channel between inflatable stiffening ribs of the suction hoses.

Thus, it is an object of at least one embodiment of the invention to provide a simple connection system that ensures proper inflation of each section.

The hose may further include a helical support spring attached to the tubular body and passing helically therealong so that the tubular body may collapse by compressing along its length and wherein the inflatable stiffening rib resists compression of the tube.

Thus, it is an object of at least one embodiment of the invention to provide a section of hose that may collapse along its length.

The hose may include a valve, venting the channel when the stiffening rib is not inflated.

Thus, it is an object of at least one embodiment of the invention to prevent damage to the hose when the ribs are not properly inflated.

These particular objects and advantages may apply to only some embodiments falling within the claims and thus do not define the scope of the invention.

BRIEF DESCRIPTION OF THE DRAWINGS

FIG. 1 is a perspective view of a pumping station showing use of the suction hose of the present invention near a natural body of water;

FIG. 2 is a cross-section of the suction hose of FIG. 1 when in the open configuration, showing inflation of ribs providing annular sectors to surround a conduit of the suction hose;

FIG. 3 is a figure similar to that of FIG. 2, showing the suction hose of FIG. 2 in the collapsed configuration;

FIG. 4 is figure similar to that of FIG. 2, showing an alternative embodiment the ribs using multiple tubes to create the stiffening structure;

FIG. 5 is a side-elevational view of one end of the suction hose of the present invention, also showing a dual, crossing-helix configuration that provides both extension and radial support of the conduit;

FIG. 6 is a figure similar to that of FIG. 5, showing the embodiment of FIG. 4 with two suction hoses connected by a coupling and the inflatable ribs are connected by an ancillary coupling;

FIG. 7 is an elevational cross-section of an alternative embodiment of the invention, having an internal supporting spring wherein the stiffening ribs serve to extend the suction hose;

FIG. 8 is a figure similar to that of FIG. 7 showing the suction hose of FIG. 7 when inflated and fully extended;

FIG. 9 is an elevational cross-section of a coupling between two suction tubes, showing the connection both of the central conduit and the stiffening ribs by means of the coupling interface;

FIG. 10 is a cross-sectional elevational view of a vent valve that prevents suction from being drawn until the ribs are properly inflated, such as may be incorporated into the couplings or a separate structure.

DETAILED DESCRIPTION OF THE PREFERRED EMBODIMENT

Figure 11:
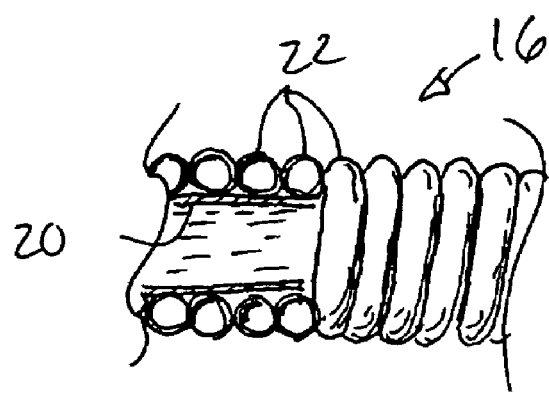
FIG. 11 is figure similar to that of FIG. 2, showing an alternative embodiment the ribs using one or more helically or annularly wound tube to create the stiffening structure.

Referring now to FIG. 1, a pumping truck 10 may carry a pumping station 12 connected to the engine of the truck to provide for pumping of water as is understood in the art.

When a normal source of pressurized water from a hydrant or the like is not available, the truck 10 may be placed near a unpressurized source of water 14, such as a lake or river, and one or more suction hoses 16 connected to the pumping station 12 to draw water 14 from the lake or river into a tank in the truck 10 and or out through a separate hose 18 for use on a fire.

Referring now to FIG. 2, in one embodiment of the present invention, the suction hose 16 employs a central flexible conduit 20, such as a plastic bonded fabric or extruded synthetic rubber, providing a water impermeable barrier. The conduit 20 is surrounded by multiple ribs 22, each forming an adjacent parallel passageway extending along the length of the suction hose 16, and each having a cross-section of a contiguous sector of a annulus surrounding the conduit 20. The ribs 22 may share material with the conduit 20 so that the conduit wall is all or in part formed by a wall of the ribs 22. The ribs 22 may be sheathed in a protective sleeve 24 and are also constructed of a flexible water-impermeable material so that each rib 22 may be inflated either with air or with water to provide a semi-rigid shell, surrounding and supporting the conduit 20 against collapse caused by external air pressure and the low-pressure suction within conduit 20. Pressure within the ribs 22 provide for an effective continuous arch surrounding the conduit 20 that prevents its collapse.

In the open configuration shown in FIG. 2, the conduit 20 may be used to draw a liquid, such as water 26, by suction through the conduit with the inflated ribs 22 supporting the conduit 20 against collapse from air pressure. An opening of 2 inches in diameter or more and as much as 6 inches in diameter may thereby be provided.

The ribs 22 are air-tight and water-tight collectively, but may have small orifices between the ribs to allow for pressure equalization so that the inflation of a single rib may inflate all ribs.

As shown in FIG. 1, an air compressor 28 may be used to inflate the ribs 22 with air or by means of an intervening water tank (not shown) with water or other liquid. Alternatively, the pumping station 12 may be enlisted for this purpose.

Referring now to FIG. 3, before use of the suction hose 16 and after use of the suction hose 16, the suction hose 16 may be collapsed by compressing it along an axis 30, perpendicular to its length with the conduit 20 collapsing on itself and the ribs 22 also flattening. In this configuration, the suction hose may be rolled like a conventional fire hose for storage and transportation.

Referring now to FIG. 4, in an alternative embodiment, the ribs 22 may be tubes 32 attached to the wall of the conduit 20 on its outside or inside and extending along its length to provide a similar stiffening function. The tubes 32 may be aligned parallel to the axis of the length of the suction hose 16 or may pass helically around the suction hose 16. In the limiting case, as shown in FIG. 11, the helical tubes may become adjacent rings communicating with each other through small holds in their sidewalls to provide a flexible bellows-like shell.

Again the tubes 32 and conduit 20 are constructed of a flexible impermeable material that may collapse in a manner similar to that shown in FIG. 3 when the hose is not in use.

Referring now to FIG. 5, in yet another embodiment, the ribs 22 may be tubes 32 and 32' passing helically about the conduit 20 in opposite directions to join at cross-points 36 to provide an open network surrounding the conduit 20 that both extends the conduit 20 radially and axially along the length 38 of the suction hose 16 when inflated to provide two directions of collapse of the suction hose 16: radially and longitudinally.

As shown in FIG. 5, ends 40 of the suction hose 16 of each of the embodiments may include standard hose couplings 42, having quick-connect or threaded engagements to allow multiple hoses 16 to be connected end-to-end to form longer continuous conduits. The ribs 22 may join with an inflation tube 44 at the ends 40 which may be connected to a corresponding inflation tube 44' of other suction hoses 16 as shown in FIG. 6. The end of the interconnected suction hoses 16 such as will be immersed in the unpressurized water source, may have its inflation tube 44 plugged by plug 46.

Referring now to FIG. 7, in an alternative embodiment, the conduit 20 may be supported by a stiffening spring 50, constructed, for example, of a flexible metal wire so that the conduit 20 is supported radially but may collapse axially along its length 38. The stiffening ribs 22, in this case, attach at separated points along the length of the conduit 20, and during collapse, fold into an accordion shape. As shown in FIG. 8, when the ribs 22 are inflated, they stiffen axially, extending the conduit 20 axially and separating the coils of the spring 50 to open the suction hose 16 by stretching it along its length.

Referring now to FIG. 9, the couplings 42 may provide for interengaging threaded portions 52 that provide for a water-tight joining of the conduits 20 of two hoses 16 and 16'. Coaxially flanges 54 extending radially about the threaded portions 52 may provide for abutting surfaces when the couplings 42 are joined, such as allow joining of ports 56 within the flanges 54 that provide for a continuous passageway between at least one of the ribs 22 in a first suction hose 16 and its corresponding rib 22 in suction hose 16'. The ribs 22 may then distribute the water among them through openings between the ribs 22. In this way, suction hose 16 may be readily joined without the need to assemble inflation tubes 44.

Referring again to FIG. 1, the passageways provided by the ribs 22 may also be used to transport water or compressed air. For example, to power an induction system 68 or pump at the far end of the hoses 16.

Referring now to FIG. 10, a relief valve 60 may be constructed in the flanges 54 or elsewhere along the length of the suction hose 16, providing for a spring piston 62 communicating on one side with an interior of a rib 22 and urged toward the rib 22 and away from a passageway 64 leading between the outside air to the center of the conduit 20 by a spring 66. When there is no pressure in the rib 22, the spring 66 holds the passageway 64 open while when there is pressure in the rib 22, that pressure moves the piston 62 to block the passageway 64 against a spring 66, thus allowing suction to build within the conduits 20.

While the specification describes the use of the proposed suction line in the context of firefighting, it may be used in any situation where water needs to be pumped.

It is specifically intended that the present invention not be limited to the embodiments and illustrations contained herein, but include modified forms of those embodiments including portions of the embodiments and combinations of elements of different embodiments as come within the scope of the following claims.

I claim:

1. A suction hose for a firefighting pumping truck comprising:
   a conduit member providing a water resistant tubular body extending between a first and second open end, the conduit flexibly opening to provide a channel for passage of water between the first and second end and collapsing for storage;
   a releasable coupling sized to attached to a standard firefighting pumping truck pump inlet to provide an water-tight connection of the channel to the pumping truck pump to allow the water to be drawn through the channel by suction exerted by the pump and
   at least one inflatable stiffening rib attached to the body to hold the conduit open against the suction of a firefighting pumping truck when water is being drawn through he channel by suction at one end by the pump and when the rib is inflated with a fluid and allowing the conduit to collapse when the rib is not inflated for storage in the firefighting pumping truck.

2. The suction hose of claim 1 wherein the collapsing flattens the tubular body in a direction perpendicular to its length.

3. The suction hose of claim 1 wherein multiple inflatable ribs extend parallel to an axis of the tubular body between the first and second ends.

4. The suction hose of claim 3 wherein the multiple inflatable ribs are tubes.

5. The suction hose of claim 3 wherein the multiple inflatable ribs are adjacent sectors of a cylindrical annulus.

6. The suction hose of claim 3 wherein the multiple inflatable ribs provide passageways among the ribs for pressure equalization.

7. The suction hose of claim 1 wherein the inflatable rib extends helically about an axis centered in the tubular body between the first and second ends.

8. The suction hose of claim 7 including at least two ribs wherein one helix is a right hand helix and the other helix is a left hand helix.

9. The suction hose of claim 1 including a first and second coupling attached to the first and second ends allowing interconnection of the suction hose with other similar suction hoses to provide a continuous channel between the suction hoses.

10. The suction hose of claim 9 wherein the couplings further provides a continuous channel between inflatable stiffening ribs of the suction hoses.

11. The suction hose of claim 1 further including a helical spring support attached to the tubular body and passing helically there along so that the tubular body may collapse by compressing along its length and wherein the inflatable stiffening rib resists compression of the tubular body.

12. The suction hose of claim 1 further including a valve venting the channel when the stiffening rib is not inflated.

* * * * *